(12) United States Patent
Mukasa et al.

(10) Patent No.: US 8,787,720 B2
(45) Date of Patent: Jul. 22, 2014

(54) OPTICAL FIBER

(75) Inventors: Kazunori Mukasa, Tokyo (JP);
Yukihiro Tsuchida, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 64 days.

(21) Appl. No.: 13/372,044

(22) Filed: Feb. 13, 2012

(65) Prior Publication Data
US 2012/0141078 A1    Jun. 7, 2012

Related U.S. Application Data

(63) Continuation of application No. PCT/JP2011/065301, filed on Jul. 4, 2011.

(30) Foreign Application Priority Data

Aug. 4, 2010 (JP) ................................. 2010-175624

(51) Int. Cl.
*G02B 6/032* (2006.01)
(52) U.S. Cl.
USPC .......................................... 385/125; 385/126
(58) Field of Classification Search
USPC .................................. 385/125–126
See application file for complete search history.

(56) References Cited

U.S. PATENT DOCUMENTS

| 6,031,955 | A  | 2/2000  | Mukasa et al. |
| 6,084,993 | A  | 7/2000  | Mukasa |
| 6,178,279 | B1 | 1/2001  | Mukasa et al. |
| 6,470,126 | B1 | 10/2002 | Mukasa |
| 6,574,405 | B2 | 6/2003  | Mukasa |
| 6,591,048 | B2 | 7/2003  | Mukasa |
| 6,600,862 | B2 | 7/2003  | Mukasa |
| 6,606,437 | B1 | 8/2003  | Mukasa et al. |
| 6,701,051 | B2 | 3/2004  | Mukasa |
| 6,707,971 | B2 | 3/2004  | Mukasa |
| 6,724,966 | B2 | 4/2004  | Mukasa |
| 6,766,088 | B2 * | 7/2004 | Hasegawa et al. ............ 385/123 |

(Continued)

FOREIGN PATENT DOCUMENTS

| JP | 2001-159721 | 6/2001 |
| JP | 2005-208268 | 8/2005 |
| JP | 2009-122277 | 6/2009 |
| JP | 2009-151253 | 7/2009 |

OTHER PUBLICATIONS

Alexander Argyros, Ian Bassett, Martijn van Eijkelenborg, Maryanne Large, Joseph Zagari, Nicolae A. Nicorovici, Ross McPhedran, and C. Martijn de Sterke, "Ring structures in microstructured polymer optical fibres," Opt. Express 9, pp. 813-820 (2001).*

(Continued)

*Primary Examiner* — Daniel Petkovsek
(74) *Attorney, Agent, or Firm* — Oblon, Spivak, McClelland, Maier & Neustadt, LLP

(57) ABSTRACT

An optical fiber includes a core portion that confines light therein and guides the light therethrough and a cladding portion that is formed around an outer circumference of the core portion. The cladding portion contains a hole which is formed at a position a distance away from the core portion such that the hole does not substantially affect an effective core area or a chromatic dispersion characteristic of the optical fiber. The hole decreases a microbending loss of the optical fiber.

6 Claims, 15 Drawing Sheets

(56) References Cited

U.S. PATENT DOCUMENTS

| | | | |
|---|---|---|---|
| 6,810,186 B2 | 10/2004 | Mukasa | |
| 6,859,599 B2 | 2/2005 | Mukasa | |
| 6,879,762 B2 | 4/2005 | Mukasa | |
| 6,879,763 B2 | 4/2005 | Mukasa | |
| 6,959,136 B2 | 10/2005 | Mukasa | |
| 6,983,094 B2 | 1/2006 | Mukasa | |
| 7,085,462 B2 | 8/2006 | Mukasa | |
| 7,085,463 B2 | 8/2006 | Takahashi et al. | |
| 7,228,040 B2 * | 6/2007 | Nakajima et al. | 385/125 |
| 7,502,540 B2 * | 3/2009 | Miyabe et al. | 385/127 |
| 7,668,428 B2 | 2/2010 | Miyabe et al. | |
| 7,693,378 B2 | 4/2010 | Mukasa | |
| 7,693,380 B2 | 4/2010 | Mukasa | |
| 7,805,040 B2 | 9/2010 | Mukasa | |
| 7,881,579 B2 | 2/2011 | Mukasa | |
| 7,903,919 B2 | 3/2011 | Mukasa | |
| 7,978,949 B2 | 7/2011 | Mukasa | |
| 8,196,435 B2 | 6/2012 | Mukasa | |
| 2002/0176678 A1 | 11/2002 | Mukasa | |
| 2003/0049005 A1 | 3/2003 | Mukasa | |
| 2005/0018986 A1 * | 1/2005 | Argyros et al. | 385/125 |
| 2006/0133753 A1 * | 6/2006 | Nelson et al. | 385/125 |
| 2009/0052853 A1 | 2/2009 | Mukasa et al. | |
| 2009/0123122 A1 | 5/2009 | Mukasa | |
| 2009/0180746 A1 | 7/2009 | Mukasa | |
| 2010/0135628 A1 | 6/2010 | Mukasa | |
| 2010/0150507 A1 * | 6/2010 | Takahashi et al. | 385/125 |
| 2011/0026890 A1 | 2/2011 | Takahashi et al. | |
| 2011/0091176 A1 | 4/2011 | Takahashi et al. | |
| 2011/0094269 A1 | 4/2011 | Mukasa | |
| 2011/0188824 A1 | 8/2011 | Mukasa | |
| 2012/0033923 A1 * | 2/2012 | Takenaga et al. | 385/125 |

OTHER PUBLICATIONS

Vipul Rastogi and Kin Seng Chiang, "Holey optical fiber with circularly distributed holes analyzed by the radial effective-index method," Opt. Lett. 28, pp. 2449-2451 (2003).*

International Search Report issued Aug. 16, 2011 in Application No. PCT/JP2011/065301.

Marianne Bigot-Astruc, et al., "Trench-Assisted Profiles for Large-Effective-Area Single-Mode Fibers", ECOC 2008, Sep. 21-25, 2008, Mo.4.B.1, 2 pages.

Yoshinori Yamamoto, et al., "OSNR-Enhancing Pure-Silica-Core Fiber with Large Effective Area and Low Attenuation", OSA/OFC/NFOEC 2010, OTuI2, 3 pages.

Yukihiro Tsuchida, et al., "Comparison of microbending loss characteristics between LMA holey fibers and conventional LMA fibers", OSA/OFC/NFOEC 2010, OTuI7, 3 pages.

Takashi Matsui, et al., "Single-mode photonic crystal fiber with low bending loss and $A_{eff}$ of >200 $\mu m^2$ for ultra high-speed WDM transmission", OSA/OFC/NFOEC 2010, PDPA2, 3 pages.

Bing Yao, et al., "Improvement of Microbending loss by Hole-Assisted Fiber", The Institute of Electronics, Information and Communication Engineers Sogo Taikai Koen Ronbunshu 2010 Nen, Tsushin (2), B-10-21, Mar. 2, 2010, pp. 359 (With English Translation).

U.S. Appl. No. 13/422,937, filed Mar. 16, 2012, Tsuchida, et al.

U.S. Appl. No. 13/366,408, filed Feb. 6, 2012, Tsuchida, et al.

* cited by examiner

FIG.3

| No. | Δ1 | Δ2 | 2a | Ra2 | Aeff | MFD | BENDING LOSS | DISPERSION | SLOPE |
|---|---|---|---|---|---|---|---|---|---|
| | % | % | μm | b/a | μm² | μm | dB/m | ps/nm/km | ps/nm²/km |
| 1 | 0.1 | -0.2 | 23.7 | 2 | 304.5 | 18.3 | 0.027 | 22.1 | 0.064 |
| 2 | 0.1 | -0.15 | 23.3 | 2 | 307.6 | 18.6 | 1.008 | 21.9 | 0.064 |
| 3 | 0.1 | -0.1 | 22.5 | 2 | 307.6 | 18.8 | 4.692 | 21.7 | 0.064 |
| 4 | 0.1 | -0.05 | 21.2 | 2 | 308.5 | 19.5 | 27.10 | 21.4 | 0.064 |
| 5 | 0.1 | -0.2 | 23.8 | 2.5 | 306.5 | 18.3 | 6.21E-3 | 22.1 | 0.064 |
| 6 | 0.1 | -0.15 | 23.4 | 2.5 | 309.6 | 18.5 | 0.045 | 22.0 | 0.064 |
| 7 | 0.1 | -0.1 | 22.5 | 2.5 | 307.5 | 18.7 | 0.491 | 21.8 | 0.064 |
| 8 | 0.1 | -0.05 | 21.3 | 2.5 | 310.0 | 19.1 | 7.263 | 21.4 | 0.064 |
| 9 | 0.1 | -0.2 | 23.9 | 3 | 308.6 | 18.3 | 1.17E-4 | 22.1 | 0.064 |
| 10 | 0.1 | -0.15 | 23.4 | 3 | 309.6 | 18.5 | 1.82E-3 | 22.0 | 0.064 |
| 11 | 0.1 | -0.1 | 22.7 | 3 | 311.6 | 18.8 | 0.042 | 21.8 | 0.064 |
| 12 | 0.1 | -0.05 | 21.4 | 3 | 311.9 | 19.1 | 1.864 | 21.4 | 0.064 |
| 13 | 0.1 | -0.2 | 23.7 | 3.5 | 304.4 | 18.2 | 2.49E-6 | 22.1 | 0.064 |
| 14 | 0.1 | -0.15 | 23.2 | 3.5 | 305.5 | 18.4 | 9.14E-5 | 22.0 | 0.064 |
| 15 | 0.1 | -0.1 | 22.5 | 3.5 | 307.5 | 18.7 | 4.83E-3 | 21.8 | 0.064 |
| 16 | 0.1 | -0.05 | 21.3 | 3.5 | 309.9 | 19.1 | 0.530 | 21.4 | 0.064 |
| 17 | 0.1 | -0.2 | 23.6 | 4 | 302.4 | 18.2 | 1.14E-7 | 22.1 | 0.064 |
| 18 | 0.1 | -0.15 | 23.2 | 4 | 305.5 | 18.4 | 6.08E-6 | 22.0 | 0.064 |
| 19 | 0.1 | -0.1 | 22.4 | 4 | 305.5 | 18.6 | 6.88E-4 | 21.8 | 0.064 |
| 20 | 0.1 | -0.05 | 21.2 | 4 | 308.0 | 19.0 | 0.247 | 21.4 | 0.064 |
| 21 | 0.15 | -0.2 | 18.9 | 2 | 206.1 | 15.2 | 0.038 | 22.0 | 0.064 |
| 22 | 0.15 | -0.15 | 18.5 | 2 | 207.2 | 15.4 | 0.095 | 21.8 | 0.064 |
| 23 | 0.15 | -0.1 | 17.7 | 2 | 204.8 | 15.5 | 0.311 | 21.5 | 0.063 |
| 24 | 0.15 | -0.05 | 16.7 | 2 | 205.2 | 15.7 | 1.060 | 21.0 | 0.063 |
| 25 | 0.15 | -0.2 | 18.8 | 2.5 | 204.4 | 15.1 | 3.78E-3 | 22.1 | 0.064 |
| 26 | 0.15 | -0.15 | 18.3 | 2.5 | 203.8 | 15.2 | 0.017 | 21.8 | 0.064 |
| 27 | 0.15 | -0.1 | 17.8 | 2.5 | 206.2 | 15.5 | 0.076 | 21.6 | 0.063 |
| 28 | 0.15 | -0.05 | 16.8 | 2.5 | 206.2 | 15.7 | 0.485 | 21.1 | 0.063 |

FIG.4

| No. | Δ1 | Δ2 | 2a | Ra2 | Aeff | MFD | BENDING LOSS | DISPERSION | SLOPE |
|---|---|---|---|---|---|---|---|---|---|
| | % | % | μm | b/a | μm² | μm | dB/m | ps/nm/km | ps/nm²/km |
| 29 | 0.15 | -0.2 | 19.0 | 3 | 207.8 | 15.2 | 2.32E-4 | 22.1 | 0.064 |
| 30 | 0.15 | -0.15 | 18.6 | 3 | 208.8 | 15.4 | 1.62E-3 | 21.8 | 0.064 |
| 31 | 0.15 | -0.1 | 17.9 | 3 | 207.8 | 15.5 | 0.016 | 21.6 | 0.063 |
| 32 | 0.15 | -0.05 | 17.0 | 3 | 209.2 | 15.8 | 0.184 | 21.1 | 0.063 |
| 33 | 0.15 | -0.2 | 18.8 | 3.5 | 204.4 | 15.1 | 1.94E-5 | 22.1 | 0.064 |
| 34 | 0.15 | -0.15 | 18.3 | 3.5 | 203.8 | 15.2 | 2.54E-4 | 21.8 | 0.064 |
| 35 | 0.15 | -0.1 | 17.8 | 3.5 | 206.2 | 15.5 | 3.72E-3 | 21.6 | 0.063 |
| 36 | 0.15 | -0.05 | 16.8 | 3.5 | 206.2 | 15.7 | 0.098 | 21.1 | 0.063 |
| 37 | 0.15 | -0.2 | 18.7 | 4 | 202.8 | 15.0 | 1.14E-6 | 22.0 | 0.064 |
| 38 | 0.15 | -0.15 | 18.3 | 4 | 203.9 | 15.2 | 2.20E-5 | 21.8 | 0.064 |
| 39 | 0.15 | -0.1 | 17.7 | 4 | 204.6 | 15.4 | 6.36E-4 | 21.6 | 0.063 |
| 40 | 0.15 | -0.05 | 16.8 | 4 | 206.2 | 15.7 | 0.036 | 21.1 | 0.063 |
| 41 | 0.2 | -0.2 | 16.0 | 2 | 155.1 | 13.3 | 6.38E-4 | 21.9 | 0.063 |
| 42 | 0.2 | -0.15 | 15.5 | 2 | 153.7 | 13.4 | 1.80E-3 | 21.6 | 0.063 |
| 43 | 0.2 | -0.1 | 15.0 | 2 | 154.4 | 13.5 | 4.42E-3 | 21.2 | 0.063 |
| 44 | 0.2 | -0.05 | 14.1 | 2 | 153.3 | 13.7 | 0.018 | 20.6 | 0.062 |
| 45 | 0.2 | -0.2 | 15.9 | 2.5 | 153.6 | 13.2 | 1.46E-4 | 21.9 | 0.063 |
| 46 | 0.2 | -0.15 | 15.4 | 2.5 | 152.2 | 13.2 | 5.99E-4 | 21.6 | 0.063 |
| 47 | 0.2 | -0.1 | 15.0 | 2.5 | 154.2 | 13.5 | 1.81E-3 | 21.3 | 0.063 |
| 48 | 0.2 | -0.05 | 14.2 | 2.5 | 154.1 | 13.6 | 9.48E-3 | 20.8 | 0.062 |
| 49 | 0.2 | -0.2 | 16.0 | 3 | 155.0 | 13.3 | 2.09E-5 | 21.9 | 0.063 |
| 50 | 0.2 | -0.15 | 15.7 | 3 | 156.4 | 13.4 | 8.53E-5 | 21.7 | 0.063 |
| 51 | 0.2 | -0.1 | 15.2 | 3 | 156.9 | 13.6 | 4.77E-4 | 21.3 | 0.063 |
| 52 | 0.2 | -0.05 | 14.4 | 3 | 156.6 | 13.7 | 3.96E-3 | 20.8 | 0.063 |
| 53 | 0.2 | -0.2 | 15.9 | 3.5 | 153.6 | 13.2 | 5.56E-6 | 21.9 | 0.063 |
| 54 | 0.2 | -0.15 | 15.5 | 3.5 | 153.6 | 13.3 | 3.99E-5 | 21.6 | 0.063 |
| 55 | 0.2 | -0.1 | 15.0 | 3.5 | 154.2 | 13.6 | 3.28E-4 | 21.3 | 0.063 |
| 56 | 0.2 | -0.05 | 14.3 | 3.5 | 155.4 | 13.7 | 2.79E-3 | 20.8 | 0.063 |

FIG.5

| No. | Δ1 | Δ2 | 2a | Ra2 | Aeff | MFD | BENDING LOSS | DISPERSION | SLOPE |
|---|---|---|---|---|---|---|---|---|---|
| | % | % | μm | b/a | μm² | μm | dB/m | ps/nm/km | ps/nm²/km |
| 57 | 0.2 | -0.2 | 15.8 | 4 | 152.2 | 13.1 | 6.83E-7 | 21.9 | 0.063 |
| 58 | 0.2 | -0.15 | 15.5 | 4 | 153.6 | 13.3 | 6.19E-6 | 21.7 | 0.063 |
| 59 | 0.2 | -0.1 | 15.0 | 4 | 154.2 | 13.5 | 1.09E-4 | 21.3 | 0.063 |
| 60 | 0.2 | -0.05 | 14.2 | 4 | 154.1 | 13.6 | 2.19E-3 | 20.8 | 0.063 |
| 61 | 0.25 | -0.2 | 14.0 | 2 | 123.7 | 12.0 | 6.11E-6 | 21.7 | 0.063 |
| 62 | 0.25 | -0.15 | 13.6 | 2 | 123.1 | 12.0 | 1.22E-5 | 21.3 | 0.062 |
| 63 | 0.25 | -0.1 | 13.1 | 2 | 122.8 | 12.1 | 2.96E-5 | 20.8 | 0.062 |
| 64 | 0.25 | -0.05 | 12.4 | 2 | 122.5 | 12.3 | 8.61E-5 | 20.2 | 0.061 |
| 65 | 0.25 | -0.2 | 14.2 | 2.5 | 126.1 | 12.0 | 1.08E-6 | 21.8 | 0.063 |
| 66 | 0.25 | -0.15 | 13.7 | 2.5 | 124.2 | 12.0 | 3.75E-6 | 21.4 | 0.063 |
| 67 | 0.25 | -0.1 | 13.3 | 2.5 | 124.9 | 12.2 | 1.02E-5 | 21.0 | 0.062 |
| 68 | 0.25 | -0.05 | 12.5 | 2.5 | 123.2 | 12.2 | 5.05E-5 | 20.4 | 0.062 |
| 69 | 0.25 | -0.2 | 14.1 | 3 | 124.9 | 12.0 | 3.16E-7 | 21.7 | 0.063 |
| 70 | 0.25 | -0.15 | 13.7 | 3 | 124.2 | 12.0 | 1.30E-6 | 21.4 | 0.063 |
| 71 | 0.25 | -0.1 | 13.3 | 3 | 124.9 | 12.2 | 4.85E-6 | 21.0 | 0.062 |
| 72 | 0.25 | -0.05 | 12.7 | 3 | 125.4 | 12.3 | 2.40E-5 | 20.4 | 0.062 |
| 73 | 0.25 | -0.2 | 14.0 | 3.5 | 123.6 | 11.9 | 1.66E-7 | 21.8 | 0.063 |
| 74 | 0.25 | -0.15 | 13.6 | 3.5 | 123.0 | 12.0 | 8.25E-7 | 21.4 | 0.063 |
| 75 | 0.25 | -0.1 | 13.2 | 3.5 | 123.7 | 12.1 | 3.90E-6 | 21.0 | 0.062 |
| 76 | 0.25 | -0.05 | 12.6 | 3.5 | 124.3 | 12.3 | 1.83E-5 | 20.5 | 0.062 |
| 77 | 0.25 | -0.2 | 13.9 | 4 | 122.4 | 11.8 | 2.78E-8 | 21.7 | 0.063 |
| 78 | 0.25 | -0.15 | 13.6 | 4 | 123.0 | 12.0 | 1.76E-7 | 21.4 | 0.063 |
| 79 | 0.25 | -0.1 | 13.2 | 4 | 123.7 | 12.1 | 1.79E-6 | 21.0 | 0.062 |
| 80 | 0.25 | -0.05 | 12.5 | 4 | 123.2 | 12.2 | 1.05E-5 | 20.4 | 0.062 |
| 81 | 0.3 | -0.2 | 12.5 | 2 | 102.2 | 10.9 | 1.85E-8 | 21.4 | 0.062 |
| 82 | 0.3 | -0.15 | 12.2 | 2 | 102.4 | 11.0 | 3.84E-8 | 21.0 | 0.061 |
| 83 | 0.3 | -0.1 | 11.8 | 2 | 102.5 | 11.1 | 1.67E-7 | 20.5 | 0.061 |
| 84 | 0.3 | -0.05 | 11.2 | 2 | 102.2 | 11.2 | 6.02E-7 | 19.8 | 0.061 |

FIG.6

| No. | Δ1 | Δ2 | 2a | Ra2 | Aeff | MFD | BENDING LOSS | DISPERSION | SLOPE |
|---|---|---|---|---|---|---|---|---|---|
|  | % | % | μm | b/a | μm² | μm | dB/m | ps/nm/km | ps/nm²/km |
| 85 | 0.3 | -0.2 | 12.5 | 2.5 | 102.1 | 10.9 | 1.57E-8 | 21.5 | 0.062 |
| 86 | 0.3 | -0.15 | 12.3 | 2.5 | 103.4 | 11.0 | 6.74E-9 | 21.2 | 0.062 |
| 87 | 0.3 | -0.1 | 11.9 | 2.5 | 103.4 | 11.1 | 3.95E-8 | 20.7 | 0.062 |
| 88 | 0.3 | -0.05 | 11.3 | 2.5 | 102.9 | 11.2 | 5.69E-7 | 20.0 | 0.061 |
| 89 | 0.3 | -0.2 | 12.7 | 3 | 104.4 | 11.0 | 2.02E-10 | 21.5 | 0.062 |
| 90 | 0.3 | -0.15 | 12.4 | 3 | 104.5 | 11.1 | 1.74E-9 | 21.2 | 0.062 |
| 91 | 0.3 | -0.1 | 12.0 | 3 | 104.4 | 11.2 | 8.62E-9 | 20.7 | 0.062 |
| 92 | 0.3 | -0.05 | 11.4 | 3 | 103.8 | 11.3 | 1.09E-7 | 20.0 | 0.061 |
| 93 | 0.3 | -0.2 | 12.6 | 3.5 | 103.3 | 10.9 | 1.66E-10 | 21.5 | 0.062 |
| 94 | 0.3 | -0.15 | 12.3 | 3.5 | 103.4 | 11.0 | 1.01E-9 | 21.2 | 0.062 |
| 95 | 0.3 | -0.1 | 11.9 | 3.5 | 103.3 | 11.1 | 9.41E-9 | 20.7 | 0.062 |
| 96 | 0.3 | -0.05 | 11.4 | 3.5 | 103.8 | 11.3 | 8.52E-8 | 20.1 | 0.062 |
| 97 | 0.3 | -0.2 | 12.5 | 4 | 102.1 | 10.9 | 8.83E-11 | 21.5 | 0.062 |
| 98 | 0.3 | -0.15 | 12.2 | 4 | 102.3 | 11.0 | 8.76E-10 | 21.2 | 0.062 |
| 99 | 0.3 | -0.1 | 11.9 | 4 | 103.3 | 11.1 | 5.11E-9 | 20.7 | 0.062 |
| 100 | 0.3 | -0.05 | 11.3 | 4 | 102.8 | 11.2 | 1.11E-7 | 20.1 | 0.062 |

FIG.7

| No. | Δ1 | Δ2 | 2a | Ra2 | Aeff | MFD | BENDING LOSS | DISPERSION | SLOPE |
|---|---|---|---|---|---|---|---|---|---|
|  | % | % | μm | b/a | μm² | μm | dB/m | ps/nm/km | ps/nm²/km |
| 1 | 0.2 | -0.1 | 14.1 | 2 | 142.8 | 13.1 | 0.024 | 20.9 | 0.062 |
| 2 | 0.2 | -0.1 | 14.2 | 3 | 143.6 | 13.1 | 3.32E-3 | 21.1 | 0.063 |
| 3 | 0.2 | -0.1 | 14.1 | 4 | 142.4 | 13.0 | 5.15E-4 | 21.1 | 0.063 |

FIG.8

| No. | Δ1 | Δ2 | 2a | Ra2 | Aeff | MFD | BENDING LOSS | DISPERSION | SLOPE |
|---|---|---|---|---|---|---|---|---|---|
| | % | % | μm | b/a | μm² | μm | dB/m | ps/nm/km | ps/nm²/km |
| 1 | 0.2 | -0.1 | 13.1 | 2 | 130.9 | 12.6 | 0.113 | 20.5 | 0.061 |
| 2 | 0.2 | -0.1 | 13.2 | 3 | 131.4 | 12.6 | 0.017 | 20.8 | 0.062 |
| 3 | 0.2 | -0.1 | 13.1 | 4 | 130.2 | 12.5 | 2.81E-3 | 20.8 | 0.062 |

FIG.10

| No. | NUMBER OF HOLES | DISTANCE L | HOLE DIAMETER d | CONFINEMENT LOSS | Aeff |
|---|---|---|---|---|---|
|  |  | $\mu m$ | $\mu m$ | dB/m | $\mu m^2$ |
| 1 | 12 | 25 | 2 | 135.78 | 1439 |
| 2 |  |  | 4 | 21.73 | 969 |
| 3 |  |  | 6 | 2.1055 | 827 |
| 4 |  |  | 10 | 1.27E-4 | 659 |
| 5 |  | 50 | 2 | 538.57 | 5761 |
| 6 |  |  | 4 | 331.22 | 4501 |
| 7 |  |  | 6 | 182.31 | 3693 |
| 8 |  |  | 10 | 34.55 | 2833 |
| 9 | 18 | 25 | 2 | 30.35 | 1043 |
| 10 |  |  | 4 | 1.01 | 868 |
| 11 |  |  | 6 | 2.74E-3 | 779 |
| 12 |  | 50 | 2 | 272.04 | 4166 |
| 13 |  |  | 4 | 80.11 | 3222 |
| 14 |  |  | 6 | 18.55 | 2855 |
| 15 |  |  | 10 | 0.23 | 2502 |
| 16 | 24 | 25 | 2 | 7.53 | 956 |
| 17 |  |  | 4 | 0.02 | 843 |
| 18 |  |  | 6 | 2.26E-7 | 762 |
| 19 |  | 50 | 2 | 121.05 | 3440 |
| 20 |  |  | 4 | 17.36 | 2908 |
| 21 |  |  | 6 | 1.49 | 2704 |
| 22 |  |  | 10 | 9.03E-05 | 2433 |
| 23 | 36 | 25 | 2 | 0.49 | 911 |
| 24 |  |  | 4 | 4.41E-8 | 823 |
| 25 |  | 50 | 2 | 25.36 | 3004 |
| 26 |  |  | 4 | 0.73 | 2763 |
| 27 |  |  | 6 | 1.94E-3 | 2623 |

FIG.11

| No. | Δ1 | Δ2 | 2a | Ra2 | Aeff | MFD | BENDING LOSS | DISPERSION | SLOPE |
|---|---|---|---|---|---|---|---|---|---|
| | % | % | $\mu$m | b/a | $\mu$m$^2$ | $\mu$m | dB/m | ps/nm/km | ps/nm$^2$/km |
| 43 | 0.2 | -0.1 | 15.0 | 2 | 154.4 | 13.5 | 4.42E-3 | 21.2 | 0.063 |
| 51 | 0.2 | -0.1 | 15.2 | 3 | 156.9 | 13.6 | 4.77E-4 | 21.3 | 0.063 |
| 59 | 0.2 | -0.1 | 15.0 | 4 | 154.2 | 13.5 | 1.09E-4 | 21.3 | 0.063 |

FIG.12

| No. | NUMBER OF HOLES | DISTANCE L | HOLE DIAMETER d | CONFINEMENT LOSS | Aeff |
|---|---|---|---|---|---|
| | | $\mu$m | $\mu$m | dB/m | $\mu$m$^2$ |
| 5 | 12 | 50 | 2 | 538.57 | 5761 |
| 6 | | | 4 | 331.22 | 4501 |
| 7 | | | 6 | 182.31 | 3693 |
| 12 | 18 | 50 | 2 | 272.04 | 4166 |
| 13 | | | 4 | 80.11 | 3222 |
| 19 | 24 | 50 | 2 | 121.05 | 3440 |

FIG.13

| No. | Δ1 | Δ2 | 2a | Ra2 | NUMBER OF HOLES | DISTANCE L | HOLE DIAMETER d |
|---|---|---|---|---|---|---|---|
| | % | % | μm | b/a | | μm | μm |
| 43-5 | 0.2 | -0.1 | 15.0 | 2 | 12 | 50 | 2 |
| 43-6 | 0.2 | -0.1 | 15.0 | 2 | 12 | 50 | 4 |
| 43-7 | 0.2 | -0.1 | 15.0 | 2 | 12 | 50 | 6 |
| 51-5 | 0.2 | -0.1 | 15.2 | 3 | 12 | 50 | 2 |
| 51-6 | 0.2 | -0.1 | 15.2 | 3 | 12 | 50 | 4 |
| 51-7 | 0.2 | -0.1 | 15.2 | 3 | 12 | 50 | 6 |
| 59-5 | 0.2 | -0.1 | 15.0 | 4 | 12 | 50 | 2 |
| 59-6 | 0.2 | -0.1 | 15.0 | 4 | 12 | 50 | 4 |
| 59-7 | 0.2 | -0.1 | 15.0 | 4 | 12 | 50 | 6 |
| 43-12 | 0.2 | -0.1 | 15.0 | 2 | 18 | 50 | 2 |
| 43-13 | 0.2 | -0.1 | 15.0 | 2 | 18 | 50 | 4 |
| 51-12 | 0.2 | -0.1 | 15.2 | 3 | 18 | 50 | 2 |
| 51-13 | 0.2 | -0.1 | 15.2 | 3 | 18 | 50 | 4 |
| 59-12 | 0.2 | -0.1 | 15.0 | 4 | 18 | 50 | 2 |
| 59-13 | 0.2 | -0.1 | 15.0 | 4 | 18 | 50 | 4 |
| 43-19 | 0.2 | -0.1 | 15.0 | 2 | 24 | 50 | 2 |
| 51-19 | 0.2 | -0.1 | 15.2 | 3 | 24 | 50 | 2 |
| 59-19 | 0.2 | -0.1 | 15.0 | 4 | 24 | 50 | 2 |

FIG.14

| No. | Aeff | MFD | BENDING LOSS | DISPERSION | SLOPE | Aeff CHANGE RATE | DISPERSION CHANGE RATE | SLOPE CHANGE RATE |
|---|---|---|---|---|---|---|---|---|
| | $\mu m^2$ | $\mu m$ | dB/m | ps/nm/km | $ps/nm^2/km$ | % | % | % |
| 43-5 | 154.5 | 13.8 | 2.28E-3 | 21.2 | 0.063 | 0.065 | 0.00 | 0.00 |
| 43-6 | 154.5 | 13.8 | 2.09E-3 | 21.2 | 0.063 | 0.065 | 0.00 | 0.00 |
| 43-7 | 154.5 | 13.8 | 1.28E-3 | 21.2 | 0.063 | 0.065 | 0.00 | 0.00 |
| 51-5 | 156.9 | 13.8 | 3.42E-4 | 21.3 | 0.063 | 0.00 | 0.00 | 0.00 |
| 51-6 | 156.9 | 13.8 | 2.25E-4 | 21.3 | 0.063 | 0.00 | 0.00 | 0.00 |
| 51-7 | 156.9 | 13.8 | 1.39E-4 | 21.3 | 0.063 | 0.00 | 0.00 | 0.00 |
| 59-5 | 154.3 | 13.8 | 6.12E-5 | 21.2 | 0.063 | 0.065 | -0.47 | 0.00 |
| 59-6 | 154.3 | 13.8 | 3.90E-5 | 21.2 | 0.063 | 0.065 | -0.47 | 0.00 |
| 59-7 | 154.3 | 13.8 | 2.38E-5 | 21.2 | 0.063 | 0.065 | -0.47 | 0.00 |
| 43-12 | 154.5 | 13.8 | 1.73E-3 | 21.2 | 0.063 | 0.065 | 0.00 | 0.00 |
| 43-13 | 154.5 | 13.8 | 8.58E-4 | 21.2 | 0.063 | 0.065 | 0.00 | 0.00 |
| 51-12 | 156.9 | 13.8 | 1.85E-4 | 21.3 | 0.063 | 0.00 | 0.00 | 0.00 |
| 51-13 | 156.9 | 13.8 | 9.58E-5 | 21.3 | 0.063 | 0.00 | 0.00 | 0.00 |
| 59-12 | 154.3 | 13.8 | 3.44E-5 | 21.2 | 0.063 | 0.065 | -0.47 | 0.00 |
| 59-13 | 154.3 | 13.8 | 1.63E-5 | 21.2 | 0.063 | 0.065 | -0.47 | 0.00 |
| 43-19 | 154.5 | 13.8 | 1.20E-3 | 21.2 | 0.063 | 0.065 | 0.00 | 0.00 |
| 51-19 | 156.9 | 13.8 | 1.32E-4 | 21.3 | 0.063 | 0.00 | 0.00 | 0.00 |
| 59-19 | 154.3 | 13.8 | 2.48E-5 | 21.2 | 0.063 | 0.065 | -0.47 | 0.00 |

FIG.17

| No. | CROSS-SECTION STRUCTURE | DESIGN PARAMETER | Aeff μm² | BENDING LOSS dB/m | DISPERSION ps/nm/km | SLOPE ps/nm²/km |
|---|---|---|---|---|---|---|
| 1 | ○ | 2a: 12.2 μm<br>Δ: 0.22 % | 142.5 | 26.66 | 19.7 | 0.062 |
| 2 | ⊙ with 12 holes | HOLE DIAMETER d: 2.5 μm<br>DISTANCE L: 50 μm<br>No. OF HOLES: 12 | 142.4 | 25.40 | 19.7 | 0.062 |
| 3 | ⊙ with 24 holes | HOLE DIAMETER d: 2.5 μm<br>DISTANCE L: 50 μm<br>No. OF HOLES: 24 | 141.5 | 18.81 | 19.6 | 0.062 |

|  |  | COMPARATIVE EXAMPLE | EXAMPLE |
|---|---|---|---|
| Aeff | [$\mu m^2$] | 140 | 138 |
| BENDING LOSS | [dB/m] | 91 | 78 |
| CUT-OFF WAVELENGTH | [nm] | 1337 | 1337 |
| MICROBENDING LOSS | [dB/km] | 13.6 | 9.4 |

STEP PROFILE

SEGMENT CORE PROFILE

TRENCH PROFILE w+SIDE CORE PROFILE

RING-SHAPED PROFILE

OPTICAL FIBER

CROSS-REFERENCE TO RELATED APPLICATIONS

This application is a continuation of PCT International Application No. PCT/JP2011/65301 filed on Jul. 4, 2011 which claims the benefit of priority from the prior Japanese Patent Applications No. 2010-175624, filed on Aug. 4, 2010; the entire contents of which are incorporated herein by reference.

BACKGROUND OF THE INVENTION

1. Field of the Disclosure

The present invention relates to an optical fiber.

2. Description of the Related Art

Along with the recent tremendous growth in Internet traffic, the power of the light transmitted through a single optical fiber has also increased; therefore, nonlinear optical phenomena in optical fibers and fiber fuses have become major problems. An effective solution to the above problems is to increase the effective core area (Aeff) of the optical fiber. However, when performing single-mode transmission at a communication waveband by using a conventional solid optical fiber that has an increased effective core area, a problem occurs in that macrobending losses and microbending losses are increased. A microbending loss is defined as an increase in the transmission loss due to a minute bend in an optical fiber that occurs when lateral pressure is applied to the optical fiber.

To decrease the macrobending loss that occurs when single-mode transmission is performed with the effective core area being increased, methods are proposed that optimize refractive index profiles. For example, an optical fiber is proposed in the "Trench-Assisted Profiles for Large-Effective-Area Single-Mode Fibers," ECOC2008, Mo.4.B.1, by Marianne Bigot-Astruc, Frans Gooijer, Nelly Montaigne, Pierre Sillard (hereinafter to be referred to as Nonpatent Reference 1), that has an effective core area that is increased to 120 $\mu m^2$ by optimizing the trench-type refractive index profile. Moreover, according to "OSNR-Enhancing Pure-Silica-Core Fiber with Large Effective Area and Low Attenuation," OFC/NFOEC2010, OTuI2, by Yoshinori Yamamoto, Masaaki Hirano, Kazuya Kuwahara, Takashi Sasaki (hereinafter to be referred to as Nonpatent Reference 2), the effective core area is increased to 134 $\mu m^2$ by optimizing a W-shaped refractive index profile.

SUMMARY OF THE INVENTION

It is an object of the present invention to at least partially solve the problems in the conventional technology.

According to an aspect of the present invention, there is provided an optical fiber which includes a core portion that confines light therein and guides the light therethrough and a cladding portion that is formed around an outer circumference of the core portion. The cladding portion contains a hole which is formed at a position a distance away from the core portion such that the hole does not substantially affect an effective core area or a chromatic dispersion characteristic of the optical fiber. The hole decreases a microbending loss of the optical fiber.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 3 is a table of the design parameters of W-shaped refractive index profiles which are designed so as to have a cut-off wavelength of 1500 nm and the optical characteristics;

FIG. 4 is a table of the design parameters of W-shaped refractive index profiles which are designed so as to have a cut-off wavelength of 1500 nm and the optical characteristics;

FIG. 5 is a table of the design parameters of W-shaped refractive index profiles which are designed so as to have a cut-off wavelength of 1500 nm and the optical characteristics;

FIG. 6 is a table of the design parameters of W-shaped refractive index profiles which are designed so as to have a cut-off wavelength of 1500 nm and the optical characteristics;

FIG. 7 is a table of the design parameters of W-shaped refractive index profiles which are designed so as to have a cut-off wavelength of 1400 nm and the optical characteristics;

FIG. 8 is a table of the design parameters of W-shaped refractive index profiles which are designed so as to have a cut-off wavelength of 1300 nm and the optical characteristics;

FIG. 10 is a table of the design parameters and the optical characteristics of cladding portions that have no core portion but have holes;

FIG. 11 is a table of the design parameters and the optical characteristics of W-shaped refractive index profiles selected from FIGS. 4 and 5;

FIG. 12 is a table of the design parameters and the optical characteristics of hole structures selected from FIG. 10;

FIG. 13 is a table of the design parameters of optical fibers that are formed by combining a W-shaped refractive index profile illustrated in FIG. 11 and a hole structure illustrated in FIG. 12;

FIG. 14 is a table of the optical characteristics of the optical fibers that have the design parameters illustrated in FIG. 13;

FIG. 17 is a table of the design parameters and the cross-section structure of an optical fiber that has a single-peak refractive index profile but does not have holes and optical fibers that are formed by combining the optical fiber and a hole structure, and the optical characteristics;

DETAILED DESCRIPTION OF THE INVENTION

Exemplary embodiments of an optical fiber according to the present invention will be explained in detail below with reference to the accompanying drawings. It should be noted that the present invention is not limited to the following embodiments. Moreover, unless otherwise specified, the cut-off wavelength indicates, herein, a fiber cut-off wavelength defined in ITU-T (International Telecommunication Union) G.650.1. The bending loss indicates the macrobending loss in a fiber with the diameter 20 mm. Unless otherwise specified, the terms herein follow the definitions and measuring methods according to the ITU-T G.650.1.

As described in the non patent literature 2, an increase in the microbending loss is the biggest obstacle to a further increase in the effective core area. An increase in the microbending loss is not only an obstacle to an increase in the effective core area but also a factor in limiting the degree of freedom when designing the optical characteristics of an optical fiber. "Comparison of microbending loss characteristics between LMA holey fibers and conventional LMA fibers," OFC/NFOEC2010, OTuI7, by Yukihiro Tsuchida, Kazunori Mukasa, Takeshi Yagi (hereinafter to be referred to as Non-patent Reference 3) describes that it is possible to suppress a microbending loss by forming holes in cross sections of a optical fiber. However, with current technique, it is difficult to stably manufacture at a high-volume optical fibers (for example, holey fibers (HFs)) that can guide light using a hole structure with many holes arranged in glass because it is difficult during the manufacturing to accurately form the many holes.

In contrast, an optical fiber according to the following embodiments can have a high manufacturability and a high degree of freedom in optical design.

Figure 1:
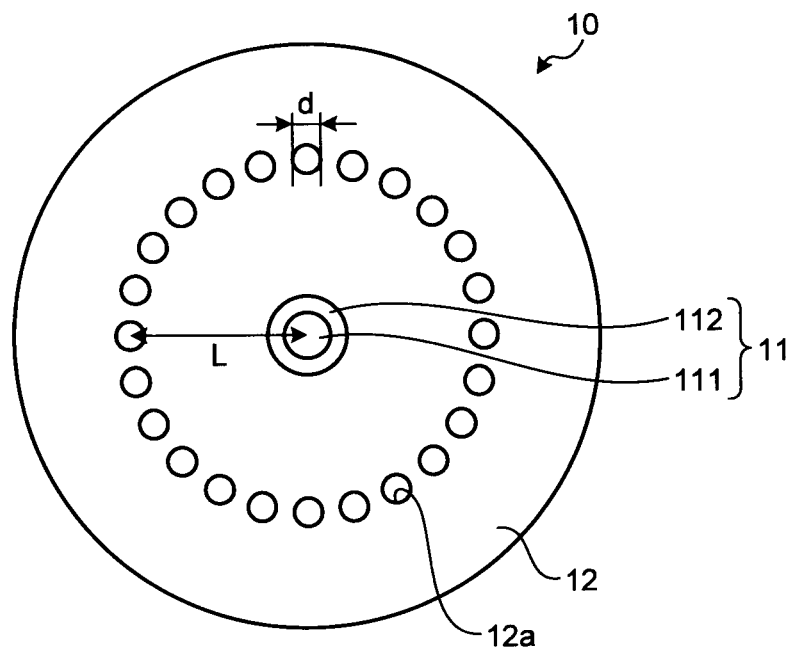
FIG. 1 is a schematic cross-sectional view of an optical fiber according to a first embodiment.

FIG. 1 is a schematic cross-sectional view of an optical fiber according to a first embodiment of the present invention. As illustrated in FIG. 1, an optical fiber 10 includes a core portion 11 that is located at the center and a cladding portion 12 that is located around the outer circumference of the core portion 11.

The core portion 11 includes a center core portion 111 and an outer core portion 112 that is located around the outer circumference of the center core portion 111. The cladding portion 12 contains 24 holes 12a that are formed at positions predetermined distances away from the core portion 11 and that are arranged in a circle whose center lies on the core portion 11, spaced an equal angle away from each other. The number of holes is merely an example and the number can be any value other than 24.

The center core portion 111 is made of silica glass that contains a dopant, such as germanium (Ge), to increase the refractive index. The outer core portion 112 is made of silica glass that contains a dopant, such as fluorine (F), to decrease the refractive index. The cladding portion 12 is made of pure silica glass that contains no refractive-index-adjusting dopant. As a result, the refractive index of the center core portion 111 is greater than that of the cladding portion 12 and the refractive index of the outer core portion 112 is less than that of the cladding portion 12.

Figure 2:
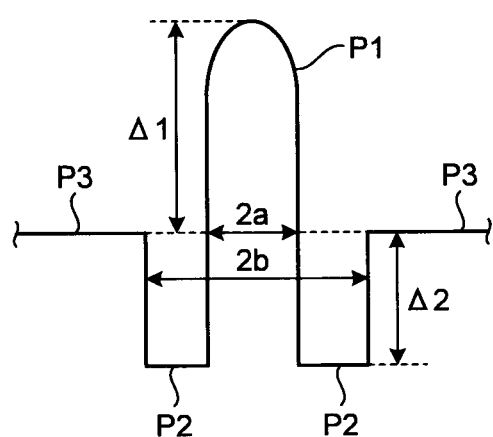
FIG. 2 is a diagram that illustrates the refractive index profile of the optical fiber illustrated in FIG. 1 near the core portion.

FIG. 2 is a diagram that illustrates the refractive index profile of the optical fiber illustrated in FIG. 1 near the core portion 11. In FIG. 2, a distribution profile P1 indicates the refractive index profile of the center core portion 111. A distribution profile P2 indicates the refractive index profile of the outer core portion 112. A distribution profile P3 indicates the refractive index profile of the cladding portion 12. Thus, the optical fiber 10 has a W-shaped refractive index profile in which the refractive index of the outer core portion 112 is less than the refractive index of the cladding portion 12. Herein, as illustrated in FIG. 2, the relative refractive-index difference of the center core portion 111 to the cladding portion 12 is $\Delta 1$, and the relative refractive-index difference of the outer core portion 112 to the cladding portion 12 is $\Delta 2$. The diameter of the center core portion 111 is $2a$, and the outer diameter of the outer core portion 112 is $2b$. The center core portion diameter $2a$ is the diameter at a position having the relative refractive-index difference $\Delta 1$ of 0% on the boundary between the center core portion 111 and the outer core portion 112. The outer core portion outer diameter $2b$ is the diameter at a position having the relative refractive-index difference the half of the relative refractive-index difference $\Delta 2$ on the boundary between the outer core portion 112 and the cladding portion 12.

By the effect of a W-shaped refractive index profile formed by the core portion 11 and the cladding portion 12, the optical fiber 10 keeps almost the entire optical field inside the core portion 11, and confines light in the core portion 11 and guides the light therethrough.

The holes 12a of the cladding portion 12 will be explained below. The diameter of each of the holes 12a is d, and the holes 12a are formed at positions away from the core portion 11 such that they cannot substantially affect the effective core area or the chromatic dispersion characteristic of the optical fiber 10. The distance of the center of each of the holes 12a from the center of the core portion 11 is L.

As described above, in the optical fiber 10, the holes 12a do not substantially affect the effective core area or the chromatic dispersion characteristic of the optical fiber 10. Moreover, the holes 12a operate as a buffer layer against a lateral pressure applied to the optical fiber 10 and, in the same manner as in a primary coat of the optical fiber, the holes 12a function to absorb or disperse the lateral pressure; therefore, the microbending loss of the optical fiber 10 is decreased. As a result, because, in the optical fiber 10, an increase of the microbending loss, which is a limiting factor of the degree of freedom when designing the optical characteristics of an optical fiber, is suppressed, the degree of freedom in design increases and, for example, an enlarged effective core area is enabled. Moreover, because, in the optical fiber 10, the holes 12a do not substantially contribute to light-guiding in the core portion 11, the required number of the holes 12a and the required positional and dimensional accuracies are decreased and, in turns, the manufacturability is increased.

A preferable designing of an optical fiber according to the first embodiment will be explained more specifically below with reference to simulation results using a finite element method. In the following, preferable values of the design parameters of W-shaped refractive index profiles as illustrated in FIG. 2 are explained, first. Then, preferable hole structures and preferable design parameters are explained. Finally, the optical characteristics of optical fibers that are formed by combining a preferable W-shaped refractive index profile and a preferable hole structure are explained.

(Design Parameters of W-Shaped Refractive Index Profiles)

FIGS. 3 to 6 are table of the design parameters of W-shaped refractive index profiles which are designed so as to have a cut-off wavelength of 1500 nm and the optical characteristics. FIG. 7 is a table of the design parameters of W-shaped refractive index profiles which are designed so as to have a cut-off wavelength of 1400 nm and the optical characteristics. FIG. 8 is a table of the design parameters of W-shaped refractive index profiles which are designed so as to have a cut-off wavelength of 1300 nm and the optical characteristics. It is noted that, in each figure, the optical characteristics are values at the wavelength of 1550 nm. "Ra2" is the ratio of the outer core portion outer diameter 2b to the center core portion diameter 2a or b/a; "Aeff" is the effective core area; "MFD" is the mode field diameter; "dispersion" is the chromatic dispersion; and "slope" is the dispersion slope. In a value of the bending loss, "E" is a sign indicative of the exponential in decimal and, for example, "6.21E-3" means "6.21×10$^{-3}$".

As illustrated in FIGS. 3 to 8, if the design parameters are set such that the center core portion diameter 2a is 11.2 μm to 23.9 μm, the relative refractive-index difference Δ1 is 0.1% to 0.3%, the relative refractive-index difference Δ2 is −0.2% to −0.05%, the ratio Ra2 is 2.0 to 4.0, then there is realized a W-shaped refractive index profile providing optical characteristics of an ability to guide light having the wavelength of 1550 nm in a single mode because the cut-off wavelength is from 1300 nm to 1500 nm, the effective core area equal to or larger than 100 μm$^2$, preferably 300 μm$^2$, and the bending loss equal to or less than 30 dB/m, preferably, 10 dB/m, and, more preferably, 1 dB/m.

(Hole Structures and Design Parameters)

Preferable hole structures and preferable design parameters will be explained below. As described above, the holes are designed so as not to substantially contribute to confinement and guide of light in the core portion and do not substantially affect the effective core area or the chromatic dispersion characteristic. In other words, the confinement loss in the fundamental mode of the light-guiding modes, the confinement loss being generated by the presence of holes is made large to a sufficient level.

Figure 9A:
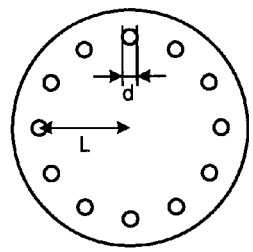
FIGS. 9A to 9C are schematic cross-sectional views of a cladding portion with 12 holes, a cladding portion with 18 holes, and a cladding portion with 24 holes, respectively.
Figure 9B:
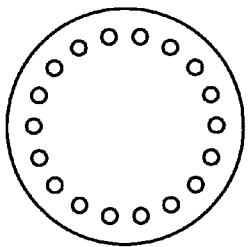
Figure 9C:
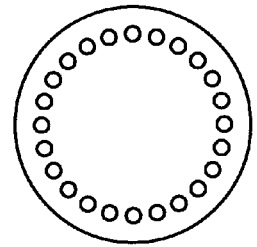

In the following, the calculated optical characteristics of optical fibers are explained that are made of pure silica glass and have no core portion but have a cladding portion containing 12 to 36 holes arranged in a circle whose center lies on the center of the cladding portion and spaced an equal angle away from each other. The number of holes is preferably 36 or less, because the holes are formed easily and the manufacturability is high. FIGS. 9A to 9C are schematic cross-sectional views of a cladding portion with 12 holes, a cladding portion with 18 holes, and a cladding portion with 24 holes, respectively. Herein, the hole diameter is d, the distance between the center of the cladding portion and each of the center of the hole is L.

FIG. 10 is a table of the design parameters and the optical characteristics of cladding portions that have no core portion but have holes. As illustrated in FIG. 10, the design parameters are set such that the number of holes is 12 to 36, the distance L is 25 μm to 50 μm, and the hole diameter d is 2 μm to 10 μm; therefore, as an optical characteristic, the confinement loss in the fundamental mode is in a sufficiently great level that is equal to or greater than 3 dB/m, preferably, 20 dB/m. Especially, the underlined examples illustrated in the figure have an extremely great confinement loss in the fundamental mode that is equal to or greater than 100 dB/m. The effective core area (Aeff) of each of such examples is an extremely large value that is equal to or larger than 1000 μm$^2$. From this point, it is supposed that the optical waveguide mode is an extremely leaky mode.

Although, in FIG. 10, because the cladding diameter of a typical optical fiber is 125 μm, the distance L is up to 50 μm, the distance L is not limited thereto. As it is clear from FIG. 10, as the distance L increases, the confinement loss increases. Therefore, if the cladding diameter is greater than 125 μm, it is allowable to set the distance L to a larger value.

Moreover, as it is clear from FIG. 10, if optical fibers have the same distance L and the same number of holes, one having the smaller hole diameter d is preferable because it has the greater confinement loss. It is noted that the hole diameter should be large enough to decrease the microbending loss and the hole diameter is preferably, for example, equal to or larger than 2 μm. Similarly, if optical fibers have the same distance L and the same hole diameter d, one having the less number of holes is preferable because it has the greater confinement loss. The number of holes should be many enough to decrease the microbending loss, for example, 12 or more.

(Optical Characteristics of Optical Fibers)

The optical characteristics of optical fibers that are formed by combining the above W-shaped refractive index profiles and the hole structures will be explained below. FIG. 11 is a table of the design parameters and the optical characteristics of W-shaped refractive index profiles selected from FIGS. 4 and 5. FIG. 12 is a table of the design parameters and the optical characteristics of hole structures selected from FIG. 10. In the following, the optical characteristics of optical fibers will be explained that are formed by combining the W-shaped refractive index profiles and the hole structures illustrated in FIGS. 11 and 12.

FIG. 13 is a table of the design parameters and the optical properties of optical fibers that are formed by combining a W-shaped refractive index profile illustrated in FIG. 11 and a hole structure illustrated in FIG. 12. In FIG. 13, for example, "No. 43-5" indicates that the optical fiber is formed by combining the design parameters indicated by "No. 43" of FIG. 11 and the design parameters indicated by "No. 5" of FIG. 12.

FIG. 14 is a table of the optical characteristics of optical fibers that have the design parameters illustrated in FIG. 13. In FIG. 14, "Aeff change rate" indicates the ratio of the difference between the value of "Aeff" of an optical fiber illustrated in FIG. 14 and the value of "Aeff" of a non-hole optical fiber illustrated in FIG. 11 that does not have the hole structure, to the value of "Aeff" of the non-hole optical fiber that does not have the hole structure. For example, the "Aeff change rate" of "No. 43-5" is the ratio of the difference between 154.5, which is the value of "Aeff" of "No. 43-5" of FIG. 14, and 154.4, which is the value of "Aeff" of "No. 43" of FIG. 11, to 154.4, i.e., (154.5−154.4)/154.4=0.065%.

The "dispersion change rate" indicates the ratio of the difference between the value of "dispersion" of an optical fiber illustrated in FIG. 14 and the value of "dispersion" of a non-hole optical fiber illustrated in FIG. 11 that does not have the hole structure, to the value of "dispersion" of the non-hole optical fiber that does not have the hole structure; and the "slope change rate" indicates the ratio of the difference between the value of "slope" of an optical fiber illustrated in FIG. 14 and the value of "slope" of a non-hole optical fiber illustrated in FIG. 11 that does not have the hole structure, to the value of "slope" of the non-hole optical fiber that does not have the hole structure.

Any optical fibers illustrated in FIG. 14 have the "Aeff change rate" within ±1%, the "dispersion change rate" within ±1%, and the "slope change rate" within ±1%. Therefore, the holes of the optical fibers illustrated in FIG. 14 do not substantially affect the effective core areas or the chromatic dispersion characteristics of the optical fibers.

Although the optical fibers illustrated in FIG. 14 have the "Aeff change rate" of ±1%, the "dispersion change rate" of ±1%, and the "slope change rate" of ±1%, when each of the rates of a certain optical fiber is within ±10%, preferably, ±5%, it is considered that the holes of the optical fiber do not substantially affect the effective core area or the chromatic dispersion characteristic of the optical fiber.

A second embodiment of the present invention will be explained below. The optical fiber according to the first embodiment has a W-shaped refractive index profile. In contrast, an optical fiber according to the second embodiment has a single-peak refractive index profile.

Figure 15:
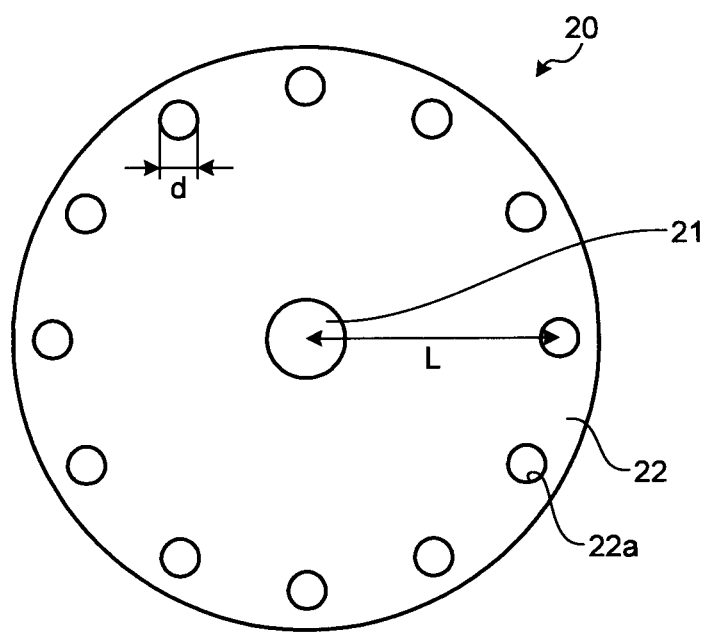
FIG. 15 is a schematic cross-sectional view of an optical fiber according to the second embodiment.

FIG. 15 is a schematic cross-sectional view of an optical fiber according to the second embodiment. As illustrated in FIG. 15, an optical fiber 20 includes a core portion 21 that is located at the center and a cladding portion 22 that is located around the outer circumference of the core portion 21. The cladding portion 22 contains 12 holes 22a that are formed at positions predetermined distances away from the core portion 21 and that are arranged in a circle whose center lies on the core portion 21, spaced an equal angle away from each other. The number of holes is merely an example and the number can be any value other than 12.

The core portion 21 is made of silica glass that contains a dopant to increase the refractive index. The cladding portion 22 is made of pure silica glass.

Figure 16:
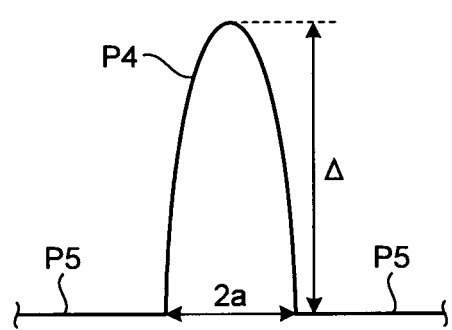
FIG. 16 is a diagram that illustrates the refractive index profile of the optical fiber illustrated in FIG. 15 near the core portion.

FIG. 16 is a diagram that illustrates the refractive index profile of the optical fiber illustrated in FIG. 15 near the core portion 21. In FIG. 16, a distribution profile P4 indicates the refractive index profile of the core portion 21. A distribution profile P5 indicates the refractive index profile of the cladding portion 22. Herein, the relative refractive-index difference of the core portion 21 to the cladding portion 22 is $\Delta$. Thus, the optical fiber 20 has a single-peak refractive index profile in which a single peak is present. The diameter of the core portion 21 is 2a. The core portion diameter 2a is the diameter position having the relative refractive-index difference of 0% on the boundary between the core portion 21 and the cladding portion 22.

By the effect of a single-peak refractive index profile formed by the core portion 21 and the cladding portion 22, the optical fiber 20 keeps almost the entire optical field inside the core portion 21, and confines light the core portion 21 and guides the light therethrough.

The diameter of each of the holes 22a of the cladding portion 22 is d, and the holes 22a are formed at positions away from the core portion 21 such that they cannot substantially affect the effective core area or the chromatic dispersion characteristic of the optical fiber 20. The distance of the center of each of the holes 22a from the center of the core portion 21 is L.

As described above, in the optical fiber 20, similar to the optical fiber according to the first embodiment, the holes 22a do not substantially affect the effective core area or the chromatic dispersion characteristic of the optical fiber 20 but decrease the microbending loss of the optical fiber 20. As a result, the optical fiber 20 has both a high degree of freedom in design and a high manufacturability.

The optical fiber according to the second embodiment will be explained more specifically below with reference to simulation results using a finite element method. In the following, the optical characteristics of an optical fiber that has a single-peak refractive index profile but does not have holes are compared with the optical characteristics of an optical fiber that is formed by combining the optical fiber and a hole structure.

FIG. 17 is a table of the design parameters and the cross-section structure of an optical fiber that has a single-peak refractive index profile but does not have holes and optical fibers that are formed by combining the optical fiber and a hole structure, and the optical characteristics. As illustrated in FIG. 17, "No. 1" indicates an optical fiber that has a single-peak refractive index profile but does not have holes: the core portion diameter 2a is 12.2 µm and the relative refractive-index difference $\Delta$ is 0.22%. "No. 2" indicates an optical fiber that is formed by combining the optical fiber of "No. 1" and a hole structure having the hole diameter d of 2.5 µm, the distance L of 50 µm, and the number of holes of 12. "No. 3" indicates an optical fiber that is formed by combining the optical fiber of "No. 1" and a hole structure having the hole diameter d of 2.5 µm, the distance L of 50 µm, and the number of holes of 24. Unless otherwise specified, the optical characteristics are values at a wavelength of 1550 nm.

The confinement losses in a first high-order mode at wavelengths of 1550 nm and 1530 nm are illustrated in FIG. 17. In the optical fiber according to the present invention, for the purpose of preventing multi-mode operations that occur when a double cladding structure is formed due to holes, a higher confinement loss in the first high-order mode is preferable. For an optical fiber that has a single-peak refractive index profile but does not have holes, such as the optical fiber of "No. 1", when the optical fiber is laid in a straight line, it is impossible to define the confinement loss; therefore, the bending loss is calculated when the optical fiber is bent at an extremely great diameter of 60 m and the calculation result is assumed to be the confinement loss.

As illustrated in FIG. 17, when each of the hole-structured optical fibers of "No. 2" and "No. 3" is compared with the optical fiber of "No. 1", it is found that the effective core area, the chromatic dispersion, and the dispersion slope are hardly changed due to the combination of the hole structure. When, in the same manner as in FIG. 14, the Aeff change rate, the dispersion change rate, and the slope change rate are calculated, any of them are within ±5% and it is found that the hole structures do not substantially affect the effective core area or the chromatic dispersion characteristics. In contract, in the same manner as in the optical fiber according to the first embodiment, it is considered that the microbending loss is decreased by the effects of the holes.

Although it is difficult for an optical fiber having a hole structure to accurately define the cut-off wavelength, herein, as disclosed in "Single-mode photonic crystal fiber with low bending loss and Aeff of >200 µm² for ultra high-speed WDM transmission," PDPA2 OFC/NFOEC 2010 by Takashi Matsui, Taiji Sakamoto, Kyozo Tsujikawa, and Shigeru Tomita (hereinafter to be referred to as Nonpatent Reference 4), the cut-off wavelength is defined to be a wavelength when the confinement loss in the first high-order mode is 1 dB/m. The confinement loss in the first high-order mode at the wavelength of 1530 nm of the optical fiber of "No. 2" illustrated in FIG. 17 is 2.51 dB/m. The confinement loss in the first high-order mode at the wavelength of 1530 nm of the optical fiber of "No. 3" is 1.67 dB/m. Therefore, the cut-off wavelength of each of the optical fibers of "No. 2" and "No. 3" is shorter than 1530 nm; therefore, they can fully operate in a single mode at the most frequently used bands of the C band and the L band (1530 nm to 1630 nm).

The design parameters of the optical fiber according to the second embodiment are not limited to the above. If, for example, the relative refractive-index difference $\Delta$ is 0.16% to 0.33% and the core portion diameter is 10 µm to 14 µm, then the characteristic in that the effective core area at the wavelength of 1550 nm is 100 µm² to 185 µm² is satisfied. If the number of holes is 12 or more, the hole diameter is 2.5±0.5 µm, the distance is 40 µm or longer, then the optical fiber operates in a single mode at both the C band and the L band and the microbending loss at the wavelength of 1550 nm is equal to or less than 80% of the microbending loss when the holes are not formed.

The center of each hole is preferably 2.5 µm or larger away from the outer edge of the cladding portion in order to ensure the mechanical strength of the optical fiber.

The embodiments will be explained more specifically below with reference to an example and a comparative example of the present invention. As the example and the comparative example of the embodiments, the hole-structured optical fiber of "No. 2" illustrated in FIG. 17 and the non-hole-optical fiber of "No. 1" that does not have holes were produced in a later-described method.

Figures 18, 19:
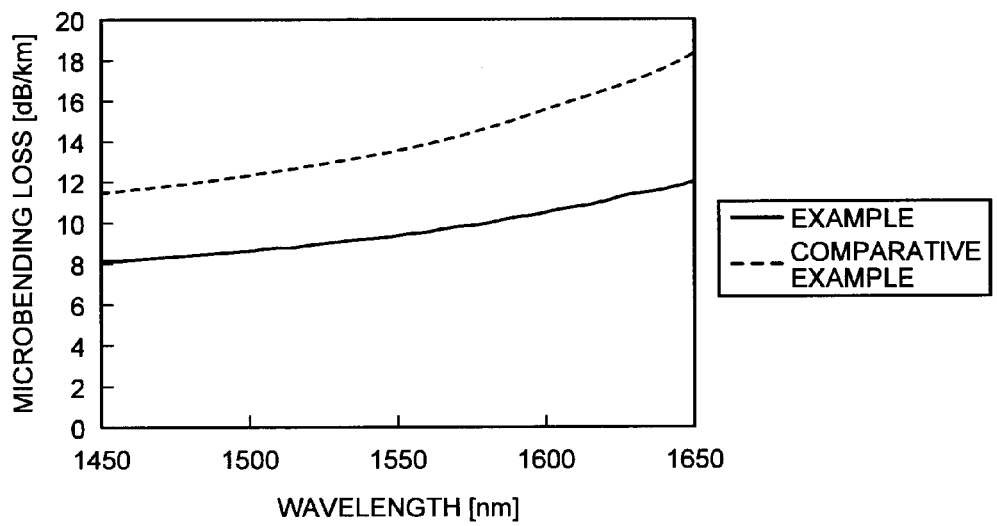
FIG. 18 is a table of the optical characteristics of optical fibers of an example and a comparative example.
FIG. 19 is a graph that illustrates the wavelength dependency of microbending losses of the optical fibers of the example and the comparative example.

FIG. 18 is a table of the optical characteristics of optical fibers of the example and the comparative example. FIG. 19 is a graph that illustrates the wavelength dependency of microbending losses of the optical fibers of the example and the comparative example. The optical characteristics except the cut-off wavelength illustrated in FIG. 18 are values at a wavelength of 1550 nm. As a microbending loss herein, the difference between the measured transmission loss of an optical fiber that is wound on a bobbin around which is wrapped with a number #1000 sandpaper and the measured transmission loss of the optical fiber that is removed from the bobbin and is bundled in a winding was employed.

As illustrated in FIG. 18, the ratio of the difference between the effective core area of the example and the effective core area of the comparative example to the effective core area of the comparative example was extremely small or about −1.4%. The cut-off wavelengths were the same. In contrast, as illustrated in FIG. 19, at a wide wavelength bandwidth, the microbending loss of the example was much less than the microbending loss of the comparative example. For example, at a wavelength of 1550 nm, the microbending loss was decreased from 13.6 dB/km to 9.4 dB/km. That is, the decrease was 13.6−9.4=4.2 dB/km as a difference and was 9.4/13.6=about 69% as a decreasing percentage. The bending loss was also decreased largely.

Although the optical fibers according to the first embodiment and the second embodiment include the W-shaped center core portion or the single-peak core portion that is made of pure silica glass containing a dopant, such as germanium (Ge), to increase the refractive index and the cladding portion that is made of pure silica glass containing no refractive-index-adjusting dopant, any material can be used as long as the optical fiber has a desired refractive index profile.

Figure 20:
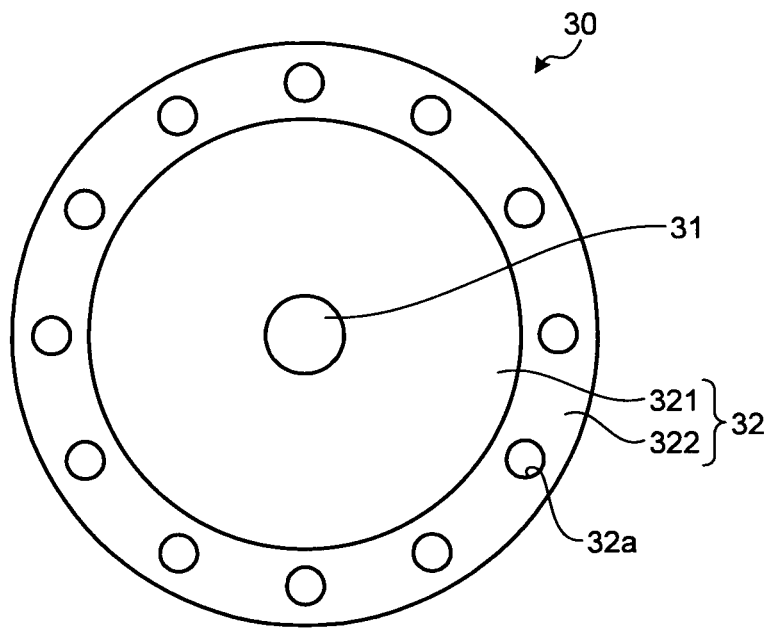
FIG. 20 is a schematic cross-sectional view of an optical fiber according to a modification of the second embodiment.

FIG. 20 is a schematic cross-sectional view of an optical fiber according to a modification of the second embodiment of the present invention. As illustrated in FIG. 20, an optical fiber 30 includes a core portion 31 that is located at the center and a cladding portion 32 that is located around the outer circumference of the core portion 31. The cladding portion 32 contains 12 holes 32a that are formed at positions predetermined distances away from the core portion 31 and that are arranged in a circle whose center lies on the core portion 31, spaced an equal angle away from each other. The cladding portion 32 includes an inner cladding portion 321 that is located around the outer circumference of the core portion 31 and an outer cladding portion 322 that is located around the outer circumference of the inner cladding portion 321. Although, in FIG. 20, the holes 32a are formed in the outer cladding portion 322, they can be formed in the inner cladding portion 321.

The core portion 31 of the optical fiber 30 has a step-index single-peak refractive index profile and is made of pure silica glass. The inner cladding portion 321 of the cladding portion 32 is made of silica glass that contains fluorine and the outer cladding portion 322 is made of pure silica glass. A core portion diameter 2a and a relative refractive-index difference Δ are specified in the same manner as in the optical fiber according to the second embodiment and they are adjustable to desired values.

The optical fiber 30 has not only the effects obtained in the optical fiber 20 according to the second embodiment but also, because the core portion 31 is made of pure silica glass that contains no refractive-index-adjusting dopant, the transmission loss is further decreased. Moreover, same as the core portion 31, the outer cladding portion 322 of the optical fiber 30 is made of pure glass. Therefore, when the optical fiber 30 is produced by drawing, because of the presence of the outer cladding portion 322 that is more viscous than the inner cladding portion 321 containing fluorine, a stress applied to the preform during the drawing is not concentrated on the core portion 31. As a result, because the distortion remaining in the core portion 31 is further decreased, the transmission loss is decreased furthermore.

An example of the method of producing an optical fiber according to the embodiments will be explained below with reference to an example of producing the optical fiber 20 according to the second embodiment.

Figure 21:
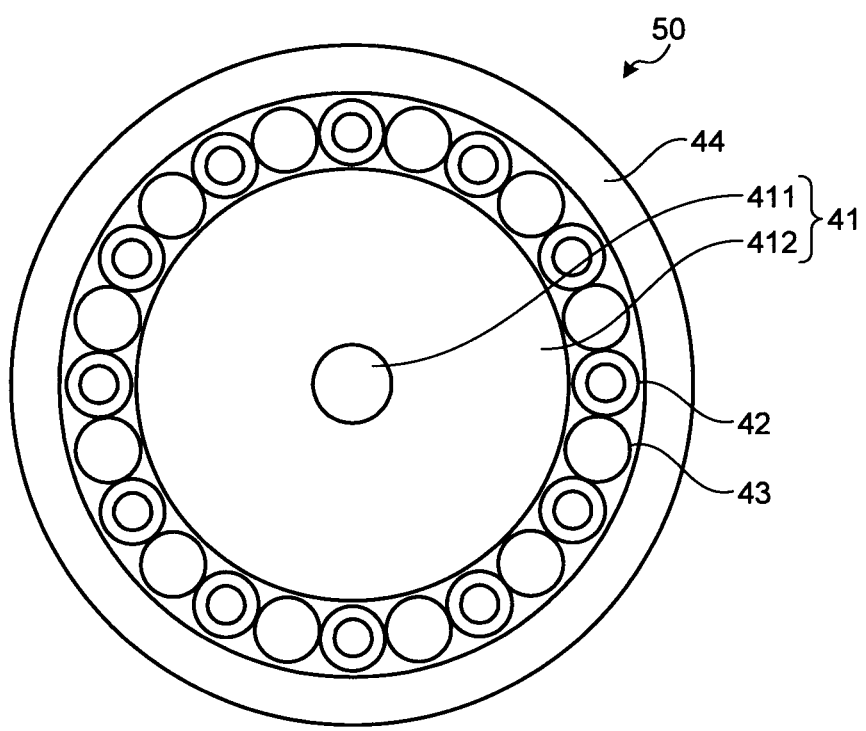
FIG. 21 is a diagram that explains an example of a method of producing an optical fiber according to the embodiment.
Figure 22A:
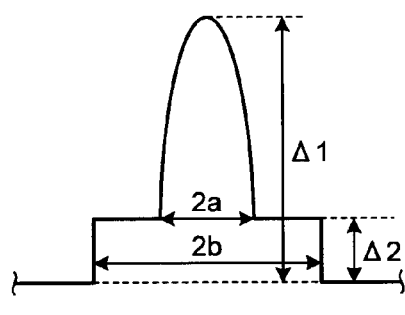
FIGS. 22A to 22E is a diagram that illustrates examples of the refractive index profiles available in the present invention.
Figure 22B:
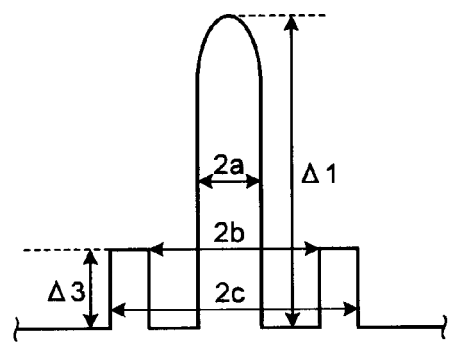
Figure 22C:
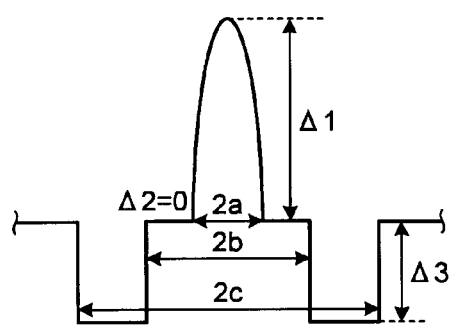
Figure 22D:
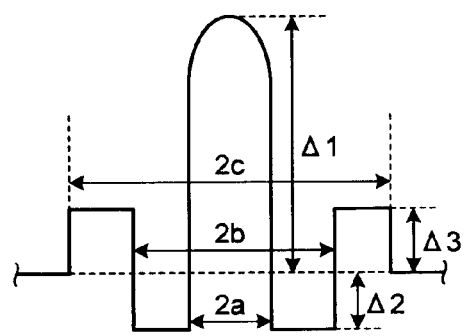
Figure 22E:
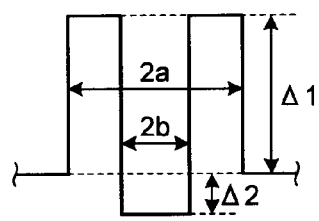

FIG. 21 is a diagram that explains an example of the method of producing an optical fiber according to the embodiment. The present production method involves forming a glass preform 41 by using a well-known VAD technique or the like. The glass preform 41 includes a core forming portion 411, which is used to form the core portion 21, and a cladding forming portion 412, which is located around the outer circumference of the core forming portion 411 and is used to form part of the cladding portion 32. Then, hollow glass capillaries 42, which are used to form the holes 32a, and solid glass rods 43, which are used to space the glass capillaries 42 a predetermined interval away from each other, are arranged around the outer circumference of the glass preform 41. Then, the glass preform 41, the glass capillaries 42, and the glass rods 43 that are bound together are inserted to a glass tube 44, thereby forming a glass preform 50. After that, the glass preform 50 is drawn by a well-known drawing machine and thus the optical fiber 20 is produced as illustrated in FIG. 15.

The method of producing an optical fiber according to the present invention is not limited to the above. For example, a producing method is allowable that involves forming holes on the glass preform 41 by drilling or the like and then drawing the glass preform, thereby producing an optical fiber.

Moreover, although, in the above embodiments, the refractive index profiles that enable optical confinement are a W-shaped index profile or a single-peak index profile, the refractive index profile of an optical fiber according to the present invention is not limited thereto and any types of refractive index profiles are available. FIGS. 22A to 22E is a diagram that illustrates examples of the refractive index profiles available in the present invention. The refractive index profiles of FIGS. 22A to 22E are a step profile, a segment core profile, a trench profile, a W+side core profile, a ring-shaped profile, respectively. The above refractive index profiles are designable to have desired optical characteristics by adjusting Δ1, Δ2, Δ3, 2a, 2b, and 2c, those illustrated in the drawings, as design parameters. Moreover, it is allowable to use a refractive index profile that is formed by combining any of refractive index profiles illustrated in FIG. 22 together.

Furthermore, the optical fiber according to the present invention can include not only holes that are at positions spaced a certain distance away such that the holes do not substantially affect the effective core area or the chromatic dispersion characteristics of the optical fiber and that function to decrease the microbending loss of the optical fiber but also holes near the core portion to assist the core portion to confine light (optical confinement assistant hole) in the same manner as in a well-known hole-assisted optical fiber. Because, as described above, the optical fiber according to the present invention can use any type of the refractive index profile as a refractive index profile that enables optical confinement, a refractive index profile formed with the contribution of an optical confinement assistant hole is available as a matter of course.

Moreover, although, in the above embodiments, the optical fiber is made of a silica-based glass material, the materials of the optical fiber according to the present invention are not limited thereto. Any other glass materials, plastic materials, or the like, that can form an optical fiber are available as appropriately.

As set forth hereinabove, an optical fiber according to the present invention is suitable for applications for optical communications.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An optical fiber comprising:
a core portion that confines light therein and guides the light therethrough; and
a cladding portion that is made of a first silica glass that is formed around an outer circumference of the core portion, wherein
the core portion includes a center core portion that is made of a second silica glass that has a refractive index greater than a refractive index of the first silica glass of the cladding portion and the core portion includes an outer core portion that is made of a third silica glass that has a refractive index less than the refractive index of the first silica glass of the cladding portion, the outer core portion being around an outer circumference of the center core portion,
the cladding portion contains between 12 to 36 holes arranged in a circular shape, a center of the circular shape laying on the core portion, a diameter of each of the holes is between 2 μm to 10 μm, and a distance between a center of one of the holes that is closest to the core portion and the center of the core portion is equal to or greater than 25 μm, and
the holes are arranged to not affect the effective core area of the optical fiber and to not affect the chromatic dispersion characteristic.

2. The optical fiber according to claim 1, wherein the effective core area at a wavelength of 1550 nm is equal to or larger than 100 μm².

3. The optical fiber according to claim 1, wherein
the relative refractive-index difference of the center core portion to the cladding portion is 0.1% to 0.3%,
the relative refractive-index difference of the outer core portion to the cladding portion is −0.2% to −0.05%,
a diameter of the center core portion is 11.2 μm to 23.9 μm, and
a ratio of an outer diameter of the outer core portion to the diameter of the center core portion is 2.0 to 4.0.

4. The optical fiber according to claim 1, wherein the core portion has a single-peak refractive index profile,
the effective core area at a wavelength of 1550 nm is 100 μm² to 185 μm².

5. The optical fiber according to claim 4, wherein
a diameter of each of the holes is 2.5±0.5 μm, and
a center of each of the holes is 40 μm or more away from a center of the core portion and 2.5 μm or more away from an outer edge of the cladding portion.

6. The optical fiber according to claim 4, wherein
a relative refractive-index difference of the core portion to the cladding portion is 0.16% to 0.33%,
a diameter of the core portion is 10 μm to 14 μm.

* * * * *